United States Patent [19]
Plester et al.

[11] Patent Number: 5,707,691
[45] Date of Patent: Jan. 13, 1998

[54] COATING HOLLOW CONTAINERS BY IN-SITU POLYMERIZATION OF MONOMERS IN BI-AXIALLY ORIENTATED FORM

[75] Inventors: George Plester; Stijn Vandekerckhove, both of Brussels, Belgium

[73] Assignee: The Coca-Cola Company, Atlanta, Ga.

[21] Appl. No.: 703,465

[22] Filed: Aug. 27, 1996

[51] Int. Cl.⁶ .................................. B05D 5/12
[52] U.S. Cl. .................. 427/472; 427/476; 427/547; 427/235; 427/236; 427/237; 427/255.6
[58] Field of Search .................. 427/472, 473, 427/476, 475, 547, 550, 235, 236, 237, 255.6

[56] References Cited

U.S. PATENT DOCUMENTS

| | | |
|---|---|---|
| 3,733,309 | 5/1973 | Wyeth et al. . |
| 3,804,663 | 4/1974 | Clark . |
| 4,069,933 | 1/1978 | Newing .................. 215/1 C |
| 4,501,781 | 2/1985 | Kushida et al. .......... 428/35 |
| 4,575,915 | 3/1986 | Clark et al. ............. 29/509 |
| 4,606,942 | 8/1986 | Shriver et al. .......... 427/233 |
| 4,725,464 | 2/1988 | Collette .................. 428/35 |
| 4,746,538 | 5/1988 | Mackowski .............. 427/38 |
| 4,892,392 | 1/1990 | Broer ................... 350/339 R |
| 4,944,576 | 7/1990 | Lacker et al. .......... 350/334 |
| 5,024,850 | 6/1991 | Broer et al. ............ 428/1 |
| 5,073,219 | 12/1991 | McArdle et al. ....... 156/242 |
| 5,468,519 | 11/1995 | Akiyama et al. ....... 427/532 |

FOREIGN PATENT DOCUMENTS

| | | | |
|---|---|---|---|
| 1140334 | 11/1962 | Germany ..................... 427/472 |
| 61-42618 | 3/1986 | Japan ......................... 427/547 |
| 63-259072 | 10/1988 | Japan ......................... 427/547 |

*Primary Examiner*—Erma Cameron
*Attorney, Agent, or Firm*—Birch, Stewart, Kolasch & Birch, LLP

[57] ABSTRACT

Methods for providing a low permeability coating on the interior of a refillable plastic container, such as a PET beverage bottle, include coating of a liquid crystal polymer (LCP) by depositing LCP monomers on the interior surface of the container and bi-axially orienting the monomers continuously while reacting the monomers to produce the polymer. The interior surface of the container may be pre-treated to produce free radicals which enhance the attachment of the monomers to the surface. Also, the surface may be post-treated to eliminate unsaturated radicals or free monomers. The application of the monomers to the interior surface of the container can be effected by condensing a gas blend of monomers, by spraying liquid monomers or by filling with liquid monomers and then emptying to leave a residual coating. The monomers are reacted by preheating them or by subjecting them to a heated inert gas. To achieve the bi-axial orientation of the monomers, the interiorly coated container may be alternately subjected to longitudinal and circumferential magnetic fields while supported for incremental end-to-end rotation and rotation about its axis. Another technique for achieving the bi-axial orientation comprises subjecting the container to alternately applied longitudinal and circumferential electrostatic fields.

10 Claims, 3 Drawing Sheets

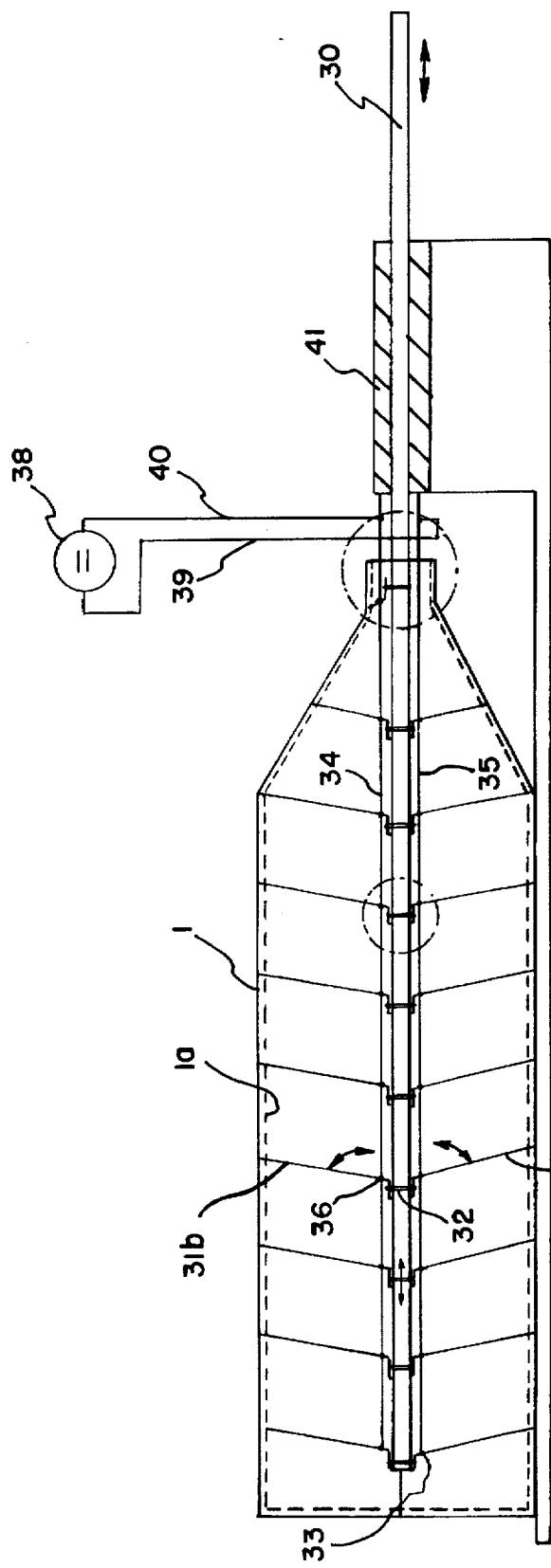
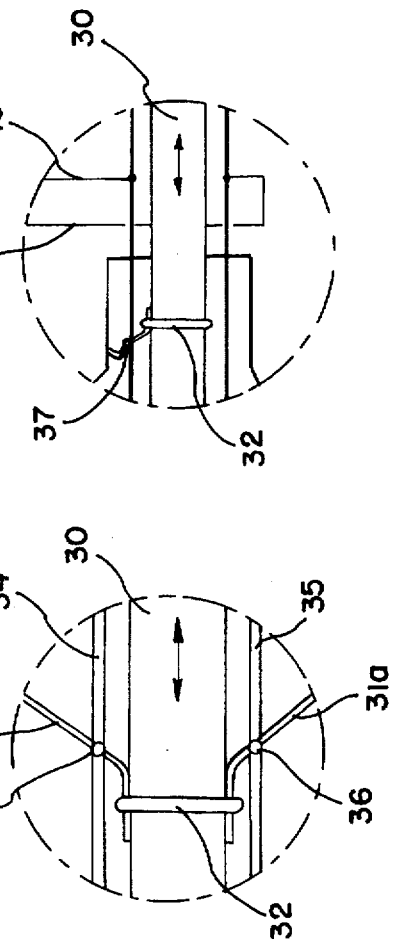
FIG. 3A
FIG. 3B
FIG. 3C

5,707,691

COATING HOLLOW CONTAINERS BY IN-SITU POLYMERIZATION OF MONOMERS IN BI-AXIALLY ORIENTATED FORM

BACKGROUND OF THE INVENTION

The present invention relates to methods of making hollow containers with low-permeability inner surfaces and more particularly hollow plastic containers with low permeability inner surfaces produced by in-situ polymerization of liquid crystal polymers (or other suitable high-barrier polymers) in bi-axially orientated form.

Plastic and metal containers have been replacing glass in many applications where easy handling, low weight and non-breakability are needed. Where metal is used, the internal metal surface of the container must often be coated with a polymer to avoid contact of the packaged content with the metal. Therefore, in the case of plastic packages, and also in case of many metal containers, the contact surface with the packaged content typically comprises a polymer.

To-date, polymers conventionally used for packaging have not been as inert to the packaged content as desirable for many applications. In the case of food packages, surface inertness is necessary to prevent desorption of packaging material components into the food, to prevent flavor-absorption, to avoid loss of food constituents through the package walls and to avoid ingress of air or other substances from outside the package. All these characteristics of inertness apply to plastic containers, however, some of these characteristics also apply to metal containers which have been internally coated with a plastic or lacquer system.

Refillable plastic packages add a further dimension to inertness requirements because these packages must withstand washing and refilling. Such containers should not absorb contact materials such as washing agents or foreign materials stored in the container.

Packages for carbonated beverages are also normally pressurized and must withstand considerable mechanical stress in handling. It is therefore difficult for a single material to provide the necessary mechanical stability and the required inertness. There is therefore a need to apply a high-barrier, thin, inner layer to a skeleton composed of conventional materials for hollow containers.

Current plastic packages for carbonated beverages either consist of a single material such as polyethylene terephthalate (PET), which provides the best compromise over all requirements, or are comprised of multi-layer structures, where usually the middle layers provide the barrier properties and the outer layers the mechanical strength properties. Such containers are produced either by co-injection or co-extrusion. However, all fail to provide an adequately inert inner surface in contact with the product. To date, plastic containers with an impermeable, dense, "glass-like" inner surface have not been able to be produced by conventional methods.

Some polymers, e.g. polyacrylonitrile, are known to have exceptional barrier properties, but can only be used in copolymer form because the homopolymer, which has the most ideal barrier properties, cannot be processed in the form of a container. A further limitation in the practical application of polymers for food or beverage containers is that polymers with high barrier properties, again as exemplified by acrylonitrile, tend to have aggressive monomers, which implies that their use is limited for food contact unless full polymerization without detectable extractables can be achieved.

Therefore the poor processability of many high-barrier polymers is a major inhibitor to their use in hollow containers. Liquid crystal polymers (LCP) are well-known for their excellent inertness and barrier properties, but there se not usable in hollow containers, since this involves processing them in multi-layer structures with conventionally-used polymers for the container skeleton, which themselves must be processed by conventional means. LCP presents the following processing problems:

High melt temperature (particularly when the best barrier polymers are used; one of best barrier is provided by high-molecular, pure PHB (poly-hydro-benzoic acid) homopolymer, but this is virtually unprocessable). Copolymerization improves processability only marginally, but reduces absorption resistance.

High glass transition temperature

Low melt strength: unsuitable for blow molding

Poor adhesion with other polymers

Bi-axial orientation is essential to barrier property and this restricts application of co-extrusion: the conventional solution for dissimilar polymers Polymer is opaque and straw-colored, because of imperfect orientation and high-temperature processing.

Recycling is yet another dimension with mass produced packages. The reuse of recycled plastic for the same purpose, i.e. to produce new containers by "closed loop" recycling, is an issue which has attracted much attention, and for PET, this has been achieved to date by depolymerizing the recycled material in order to free it of all trace contaminants which might otherwise migrate and come into contact with the container content. An impermeable inner layer, which is the purpose of the invention, would enable recycled material to be reused directly for new containers, i.e. without special treatment such as depolymerization, since traces of foreign substances could no longer contact the container's content. This would simplify the "closed loop" recycling process considerably by obviating the need for depolymerization.

Furthermore, recyclability within established recycling systems, both "open loop", i.e. recycling for other uses, or "closed loop", i.e. reuse for same purpose, is necessary for any mass produced package. in "open loop" systems, the normal method is to separate, clean and chop up the plastic into small flakes. The flake is then either melted and used for molding other objects or for fiber production. For this type of recycling, it is important that any contaminant to the main plastic, such as coating, or an inner layer, should effectively be present in small quantities and, preferably, be solid, chemically-insert and insoluble within the molten plastic, so that it can be filtered off prior to sensitive applications, such as fiber production. Since PET is also recycled in "closed loop" systems by depolymerization and it is important that the inner layer material should be unchanged by this process, be insoluble in the monomers resulting from the process, and be easily separable from these monomers. A chemically-stable, thin, inner layer, with very high melting point, fulfills these criteria.

SUMMARY OF THE INVENTION

Accordingly, it is the primary object of this invention to deposit a very thin inner layer composed of a polymer chosen for its high barrier and/or inertness properties, and in particular a liquid crystal polymer (LCP) within a container constructed mainly from another polymer, by reacting the appropriate monomers of the high-barrier polymer directly on the surface of the container, in such a manner so as to ensure, that (a) the container is not damaged by excessive heating, (b) the high-barrier polymer is chemically bound, and thus firmly attached, to the container surface and (c) the polymer is formed in conditions which simultaneously and continuously impose biaxial orientation.

This and other objects are fulfilled by a method and apparatus for bringing monomers, particularly monomers of LCP as exemplified by the polymer of p-hydroxybenzoic acid, in contact with the surface of a container, particularly a PET container. These monomers are bi-axially orientated by the application of an external electric or electromagnetic field, and the formation of the polymer occurs under conditions of continuous bi-axial orientation, leading to a high-effective bi-axially orientated product. For this process, monomers must be chosen which have adequate di-pole moments. Pre-treatment of the container surface, so as to induce either acid or hydroxyl free radicals enables part of he monomer, particularly p-hydroxybenzoic acid and other LCP-monomers, to attach to the surface and provide good adhesion.

Since the polymer is produced in-situ, its processability in conventional forming equipment is no longer an issue and this enables choice of polymers and molecular weights which would not be practicable due to the processing limitation. Avoiding the need to remelt the polymer after polymerization, eliminates color-producing degradation products, which are formed when high-melting point polymers are processed. Monomers are much more easily orientated than polymers, because of their low viscosity and relatively high di-pole moments, so that the resulting bi-axial orientation of an in-situ polymerized and continuously orientated monomer is much more effective than conventional orientation and polymers. This enables better transparency, hitherto a problem with LCP, and even better barrier properties. Therefore, the processing, adhesion and appearance problems of LCP described above, and of similar high-barrier substances, are avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 3A, 3B and 3C are diagrammatic views of a method in accordance with a third embodiment of the present invention, which utilizes an electrical field to orientate the monomers.

DETAILED DESCRIPTION OF THE INVENTION

Figure 1:
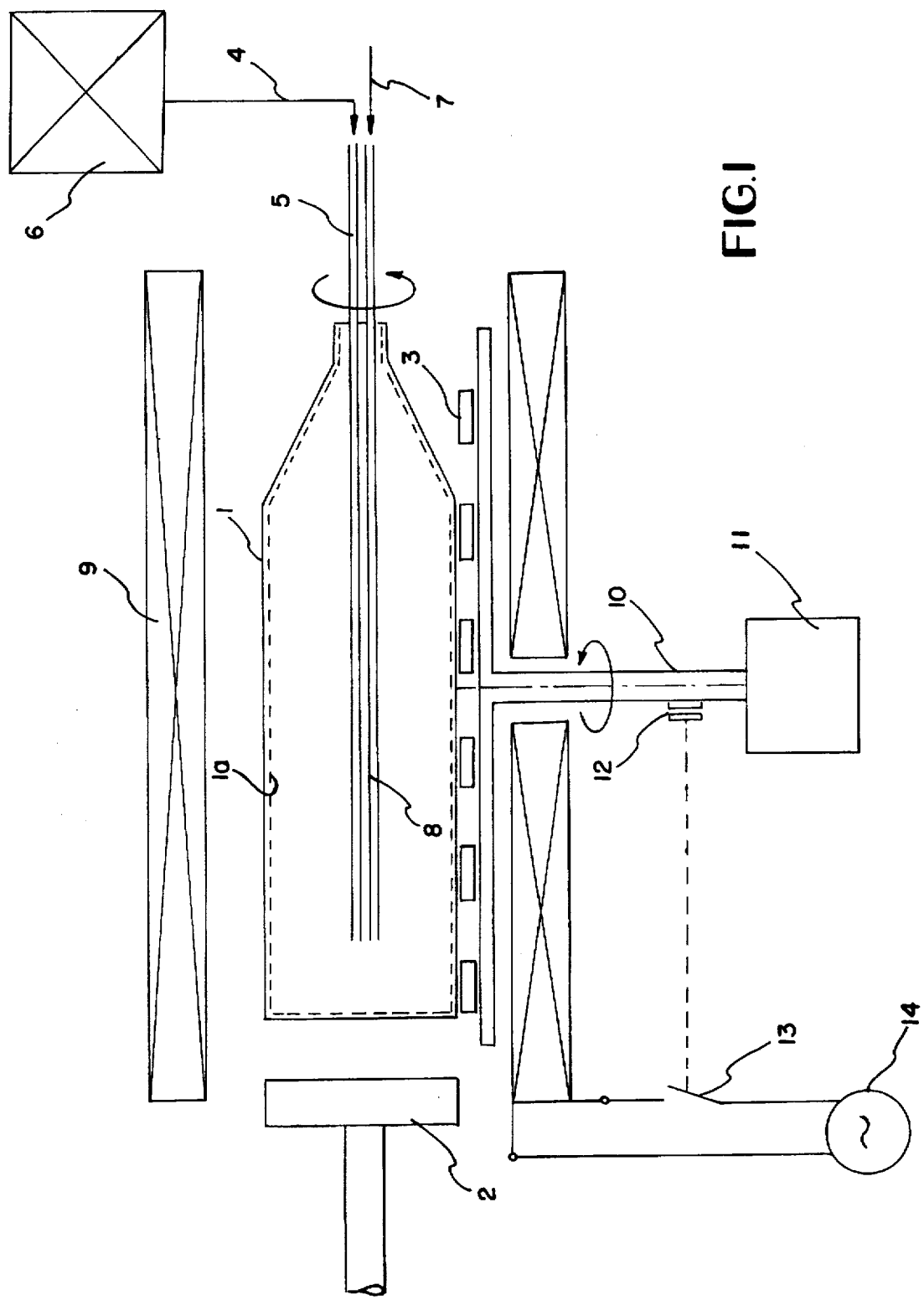
FIG. 1 is a diagrammatic view of a method in accordance with a first embodiment of the present invention, which utilizes an electromagnetic field to orientate the monomers.

Referring to the drawings and more particularly to FIG. 1, container 1 is automatically placed in the coating position by pusher 2, or similar conventional device for locating containers in a given position. In this coating location, container 1 is placed on rollers 3, which rotate container 1 about its main axis. A gas blend 4 consisting of monomers, and, where necessary, inert gases in appropriate proportions and consistency, are introduced through distributor tube 5, or a multiplicity of distributor tubes 5 when the components must not be blended but rather kept separate. The monomers are caused to condense on the walls of container 1 by cooling the outside of container 1. This can be achieved by conventional means, either by passing a cold air stream outside container (not shown), or by passing a coolant into the rollers 3, which are in contact with the container 1, or by part-immersing the container 1 in a horizontal bath (not shown) in which a coolant flows, or by similar means. The design of the monomer preparation, blending and metering system 6 will depend on the actual substances used and be carried out by conventional means, involving metering and evaporation of monomer(s), metering of catalysts, metering and where needed blending of inert gas(es), and ducting the metered components, either blended or separately, to the distributor tube 5 or to a multiplicity thereof.

The method described enables deposition of a very thin monomer film 1a on the inside of container 1 at a controlled rate and temperature and in a manner giving full, even coverage. Except for monomer condensation on the walls of container 1, as described, another possibility for distributing a controlled, thin, inner deposit of monomer is by spraying, where distributor tube 5 has a suitable spray device fitted on its end (not shown) and is made to move horizontally in container 1 so as to ensure an even complete coverage of the surfaces. Finally, the container can be filled with liquid monomers, using a conventional filling system, allowed to empty for a predetermined time, which results in residual monomer on the walls of container 1.

Container 1 can then be located in the reaction position shown in FIG. 1 at which time container 1 will already have a thin, inner deposit of monomer.

The reaction temperature may be achieved either by preheating the monomer(s) as already described and/or by ducting a pre-heated inert gas stream 7 into container 1 by means of tube 8. During the reaction, heat will be generated, and in case of a heat sensitivity container 1, such as with an orientated PET-container, the container's temperature may be kept to the limits imposed by the container's material by the external cooling means already described.

The heating of the container 1 material can be kept to a minimum by controlling the flow of monomers to the surface and by dilution with inert gas. The reaction itself requires a certain temperature, which can be reduced by using appropriate catalysts, and particularly by the orientation of the monomers which is a feature of this invention, and which will enhance the reactivity of these monomers at lower temperatures. The reactivity at lower temperatures can be further enhanced by using more reactive monomers, and particularly in the case of LCP, by using the acid anhydride and adding water as a separate reagent.

The container 1 is placed in an electromagnetic coil 9, which is shown in section and diagrammatically, and is sized to permit container 1 to lie within it either longitudinally (as shown) or transversely. The rollers 3 are placed on a rotating platform 10 which can turn the container 1 within the electromagnetic coil 9. The rotating platform 10 is made to index by rotating 90° for each index operation by a conventional electrical or mechanical indexing device 11. A position switch 12 detects position of rotating platform 10 so that it opens switch 13 when the platform moves as part of its indexing motion, and closes switch 13 as soon as the next index position, 90° further, is reached and the indexing motion stops. The switch 13 is connected to an electrical supply The Therefore, the electromagnetic coil 9 is switched off when the container 1 is moving, and applied whenever container 1 is at rest, so that the monomers deposited on the inner surface of container 1 are subjected to an orientating field, which varies sequentially by 90° and whose cycle periods can be finely controlled. This variable electromagnetic field will induce a biaxial orientation within the monomer deposit and therefore within the subsequently-formed polymer.

Adhesion of the polymer to the inner surface of container 1 is achieved by activating surface of container 1 immediately prior to the deposition process described, so as to form free radicals on the surface, which in turn will react with monomers, thus linking the monomer chain to the container (s) wall. According to the material of container 1, this can be done by depositing a primer chemical, in the manner already described by using the monomer preparation blending and metering system 6, or by flame-treatment of the inside surface, or by plasma-treatment using an inert gas, such as helium, or a reactive gas, such as oxygen.

Further, the thin, inner deposit of polymer in container 1 enables post-treatment, by virtue of its thinness. Post-treatment can be used to eliminate unsaturated radicals, or free monomers, either by reaction, say using a UV-source or by deaeration. Only very thin deposits of polymer, which this invention enables, can be treated effectively in this way.

Figure 2:
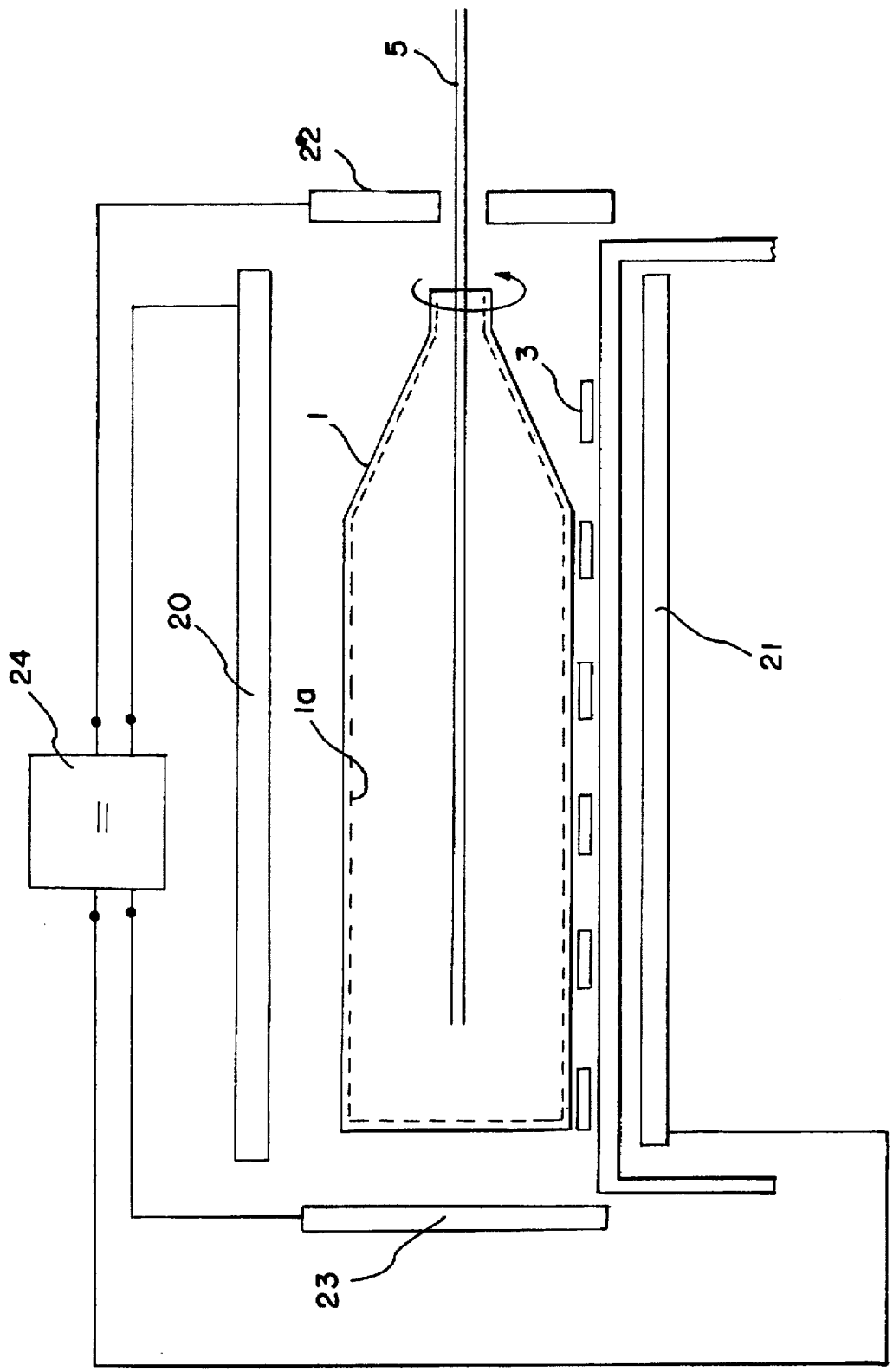
FIG. 2 is a diagrammatic view of a method in accordance with a second embodiment of the present invention, which utilizes an electrostatic field to orientate the monomers.

A further embodiment of the orientation process is shown in FIG. 2, where container 1 is placed between inside two semi-circular electrostatic plates 20, 21, and two flat electrostatic plates 22, 23. An electrostatic generator 24 alternatively switches an electrostatic field either between the semi-circular plates 22, 23 or between the flat plates 20, 21, so as to produce two electrostatic fields at 90° to each other, which are switched consecutively and at predetermined cycling intervals and thus provide a biaxial orientating field.

Another embodiment of the orientation process is shown in FIGS. 3A, 3B and 3C. An assembly consisting of a control rod 30, on which 2 sets of a series of folding contact terminals 31a, 31b are attached by clips 32, also has an end-terminal 33 at base of container 1 and end-terminal 37 at neck of container 1, and electrical connector rods 34, 35, on which the folding contact terminals 31a, 31b are hinged by means of hinges 36. The electrical connector rods 34, 35 are connected to an electrical supply 38 and supply terminals 39, 40 and fixed to an insulated bracket 41. The folding contact terminals 31a, 31b are folded by the lateral motion of the control rod 30, which forces the folding contact terminals 31a, 31b to move laterally at their root as located by clip 32 and thus rotate at hinge 36 against the fixed/immovable connectors rods 34, 35. The effect is similar to the closing of an umbrella and enables the assembly to fold and be inserted within the container, after deposition of monomer in the manner already described.

Once within the container, the control rod 30 moves in the opposite direction to that described for closing folding contact terminals 31a, 31b so that the folding contact terminals 31a, 31b fold out to contact the walls of container 1. This makes a circuit between folding contact terminals 31a which are connected to supply terminal 39 and folding contact terminals 31b, which are connected to supply terminal 40 completing a circuit between them and providing circumferential orientating field-force. The control rod 30 then moves laterally toward the base of container 1, which causes folding contact terminals 31a, 31b to move away from the container 1 wall and forces end-terminals 33, 37 to contact the container 1 walls at their appropriate locations, providing an end-to-end orientating field-force. Since the contact points of folding contact terminals 31a, 31b and end-terminal 33, 37 will produce an interruption to the coated surface, it is necessary to turn container 1 and to repeat the coating operation, so that these terminals contact another part of the surface on the second coating cycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of coating a surface of a plastic container by in-situ polymerization of monomers in biaxially oriented form, comprising the steps of:

coating the container surface with the monomers;

applying a magnetically or electrically generated field to the monomers in at least two generally perpendicular directions to biaxially orient the monomers; and curing the monomers to form a biaxially oriented polymer coating on the surface of the container.

2. The method of claim 1 including the further step of pre-treating the surface of the container to produce free radicals which aid the attachment of the monomers to the surface after the step of pretreating.

3. The method of claim 2 including the further step of post-treating the polymer coating to remove free radicals and unpolymerized monomers.

4. The method of claim 1 wherein the coating of monomers is applied to the surface by spraying.

5. The method of claim 1 wherein the coating of monomers is applied by condensing gaseous monomers onto the surface.

6. The method of claim 1 wherein the coating of monomers is applied to the interior surface of the container by filling the container with liquid monomers and emptying the liquid leaving a residual coating.

7. The method of claim 1 wherein the field is applied along a longitudinal axis of the container and orthogonally thereto.

8. The method of claim 7 wherein the field is from a magnetic source.

9. The method of claim 7 wherein the field is from an electric source.

10. The method of claim 1 wherein the polymer coating is a liquid crystal polymer.

* * * * *